United States Patent
Buchler et al.

(10) Patent No.: US 10,154,065 B1
(45) Date of Patent: Dec. 11, 2018

(54) POLICY MANAGEMENT IN SOFTWARE CONTAINER COMPUTING ENVIRONMENTS

(71) Applicant: Trend Micro Incorporated, Tokyo (JP)

(72) Inventors: Marek Buchler, Ottawa (CA); Kevin Boyce, Ottawa (CA)

(73) Assignee: Trend Micro Incorporated, Tokyo (JP)

( * ) Notice: Subject to any disclaimer, the term of this patent is extended or adjusted under 35 U.S.C. 154(b) by 169 days.

(21) Appl. No.: 15/273,261

(22) Filed: Sep. 22, 2016

(51) Int. Cl.
*H04L 29/06* (2006.01)

(52) U.S. Cl.
CPC .................................. *H04L 63/20* (2013.01)

(58) Field of Classification Search
None
See application file for complete search history.

(56) References Cited

U.S. PATENT DOCUMENTS

| | | | |
|---|---|---|---|
| 5,864,620 A | 1/1999 | Pettitt | |
| 6,701,382 B1 | 3/2004 | Quirt et al. | |
| 6,988,248 B1 | 1/2006 | Tang et al. | |
| 8,468,356 B2 | 6/2013 | Sahita et al. | |
| 8,966,464 B1 | 2/2015 | Christopher et al. | |
| 9,122,562 B1 | 9/2015 | Stickle | |
| 9,124,664 B1 | 9/2015 | Ravindranath | |
| 9,183,528 B2 | 11/2015 | Gemmell et al. | |
| 9,250,891 B1 | 2/2016 | Beranek et al. | |
| 9,256,467 B1 | 2/2016 | Singh et al. | |
| 9,360,853 B2 | 6/2016 | Kiffmeier et al. | |
| 9,471,353 B1 | 10/2016 | Christopher et al. | |
| 9,560,081 B1 * | 1/2017 | Woolward | H04L 63/20 |
| 2010/0132012 A1 * | 5/2010 | van Riel | G06F 21/53 726/1 |
| 2016/0342786 A1 * | 11/2016 | Gerebe | G06F 21/52 |
| 2016/0381075 A1 * | 12/2016 | Goyal | H04L 63/20 713/176 |
| 2017/0374102 A1 * | 12/2017 | Woolward | H04L 63/0263 |

* cited by examiner

*Primary Examiner* — Christopher A Revak
(74) *Attorney, Agent, or Firm* — Okamoto & Benedicto LLP

(57) ABSTRACT

A system for managing computer security policies includes a policy management system that provides computer security policies to container host machines. The policy management system retrieves images of software containers from an image registry and generates computer security policies that are specific for each image. A container host machine informs the policy management system when an image is pulled from the image registry into the container host machine. The policy management system identifies a computer security policy that is applicable to the image and provides the computer security policy to the container host machine. The container host machine can also locally identify the applicable computer security policy from among computer security policies that are received from the policy management system. The container host machine enforces the computer security policy and other currently existing computer security policies.

17 Claims, 5 Drawing Sheets

POLICY MANAGEMENT IN SOFTWARE CONTAINER COMPUTING ENVIRONMENTS

BACKGROUND OF THE INVENTION

1. Field of the Invention

The present invention relates generally to computer security, and more particularly but not exclusively to methods and systems for managing computer security policies in computing environments that deploy software containers.

2. Description of the Background Art

A software container wraps an application program to include auxiliary program code, such as runtime, system tools, system libraries, etc., that the application program needs to run in a host machine. Unlike a virtual machine that runs on its own guest operating system, a container does not have its own operating system; the container shares the host operating system with other containers in the host machine. Containers are lightweight and relatively easy to deploy compared to virtual machines, hence the continued increasing popularity of containers. Containers may be implemented using the DOCKER software containerization platform, for example.

Computer security policies comprise rules that govern what can and cannot be done in a computer network, such as an enterprise network. Policies may be enforced to control and limit the operations of application programs and access to computing resources, but policy management is especially difficult with containers because of their ease of deployment.

SUMMARY

In one embodiment, a system for managing computer security policies includes a policy management system that provides computer security policies to container host machines. The policy management system retrieves images of software containers from an image registry and generates computer security policies that are specific for each image. A container host machine informs the policy management system when an image is pulled from the image registry into the container host machine. The policy management system identifies a computer security policy that is applicable to the image and provides the computer security policy to the container host machine. The container host machine can also locally identify the applicable computer security policy from among computer security policies that are received from the policy management system. The container host machine enforces the computer security policy and other currently existing computer security policies.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

A computer security policy may dictate the permissible operations of a particular application program or usage of a particular computing resource. Application-specific policies (i.e., policies that apply to a particular application program) are preferable to general policies (i.e., policies that apply to all application programs), as a general policy tends to be too permissive because it does not address a vulnerability of a particular application program or too restrictive as it applies the policy to all application programs regardless of relevance. Therefore, it is preferable to have policies that are tailored for the application programs that are running in the host machine.

Policies may be assigned manually by a network administrator (or other personnel) or automatically by remote or local scanning of the host machine. Scanning of the host machine allows for collection of information on the application programs (including their files and processes) and network protocols that are being used. Based on the collected information, vulnerabilities can be correlated using rule databases and security policies with rules that address the vulnerabilities can be assigned to the computer system. These techniques for assigning policies work well when the workloads are relatively static and predictable, where a given host machine will be running a known set of software for its lifecycle.

Containers allow workloads to be readily distributed across a cluster of nodes in a highly dynamic fashion. This results in the number and type of application programs running on a host machine dynamically changing according to cluster node utilization and replacement. Existing techniques for assigning policies are not suitable for dynamic containerized environments because the time to respond and assign policies to a new workload may be longer than the lifecycle of the workload.

Figure 1:
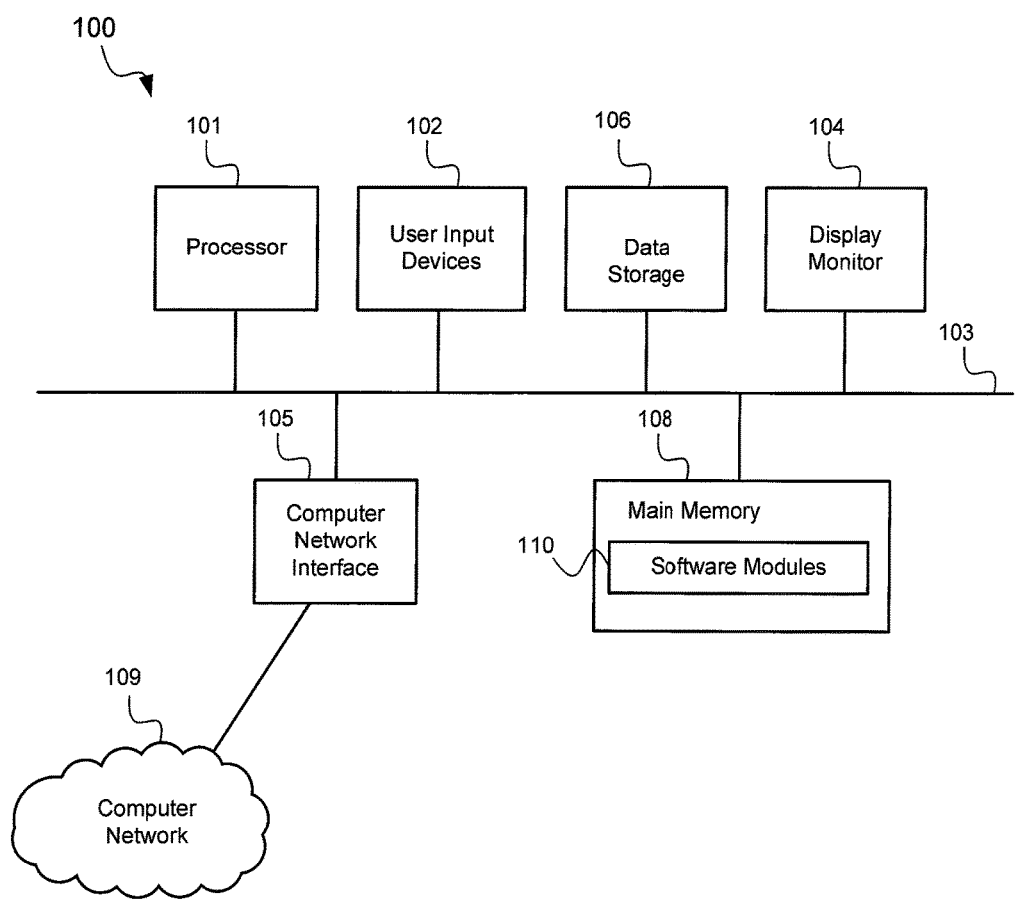
FIG. 1 shows a schematic diagram of a computer system that may be employed with embodiments of the present invention.

Referring now to FIG. 1, there is shown a schematic diagram of a computer system 100 that may be employed with embodiments of the present invention. The computer system 100 may be employed as a container host machine, a policy management system, and other computers described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules.

Figure 2:
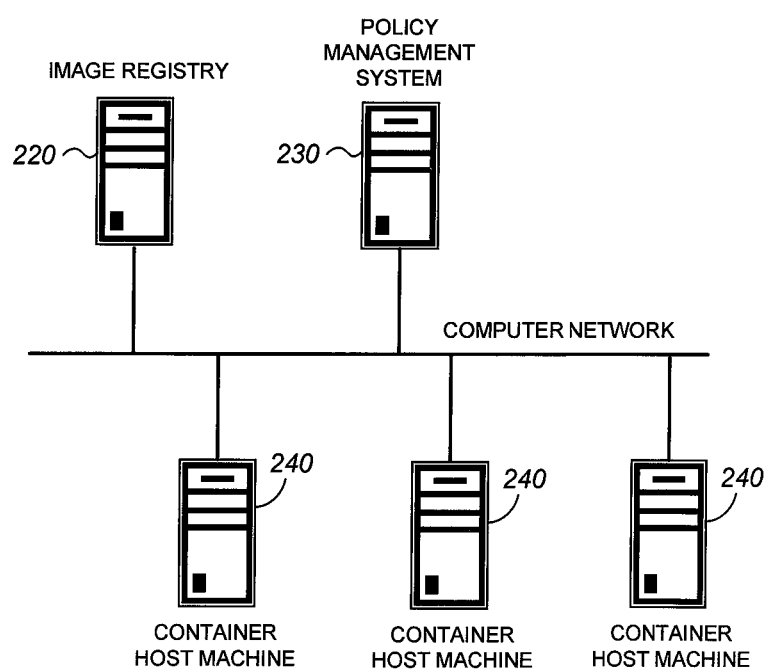
FIG. 2 shows a schematic diagram of a system for managing computer security policies in accordance with an embodiment of the present invention.

FIG. 2 shows a schematic diagram of a system for managing computer security policies in accordance with an embodiment of the present invention. In the example of FIG. 2, the system includes an image registry 220, a policy management system 230, and one or more container host machines 240. In the example of FIG. 2, the image registry 220, policy management system 230, and container host machines 240 may comprise computer systems that are on-premise within a private computer network, such as an enterprise network. In some embodiments, the policy management system 230 is off-premise, i.e., outside the private computer network, and communicates with the image registry 220 and the container host machines 240 over the Internet.

An image registry 220 serves as a repository of images and all versions (referred to as "tags") of the images. Generally speaking, an image comprises a file that packs an application program (or application programs) and an environment for running the application program, whereas a container is a running instance of an image. The application program that is containerized in the image may provide a web server, software as a service (SaaS), or other service or function. The image registry 220 may comprise a computer system with a processor and memory, with the memory storing instructions that when executed by the processor cause the image registry 220 to store images and to provide an image to a requesting computer system, which in this example may be a container host machine 240 or a policy management system 230. In one embodiment, the images stored in the registry 220 are images of containers of the DOCKER containerization platform.

A container host machine 240 may comprise a computer system that hosts containerized application programs. A container host machine 240 may comprise a processor and a memory, with the memory storing instructions that when executed by the processor cause the computer host machine 240 to retrieve an image from the image registry 220 over the computer network, run the application program (or application programs) containerized in the image, report the presence of the image to the policy management system 230, receive from the policy management system 230 one more policies that apply to the image, and enforce the policies. In one embodiment, as further discussed with reference to FIG. 3, the instructions in the memory of the container host machine 240 implement an agent 241 that works in conjunction with the policy management system 230.

A policy management system 230 may comprise a computer system with a processor and a memory, with the memory storing instructions that when executed by the processor cause the policy management system 230 to retrieve images from the image registry 220, create policies for the images, receive a notification from the container host machine 240 that a particular image has been pulled into the container host machine 240, identify a policy that applies to the particular image, and provide the policy to the container host machine 240.

Figure 3:
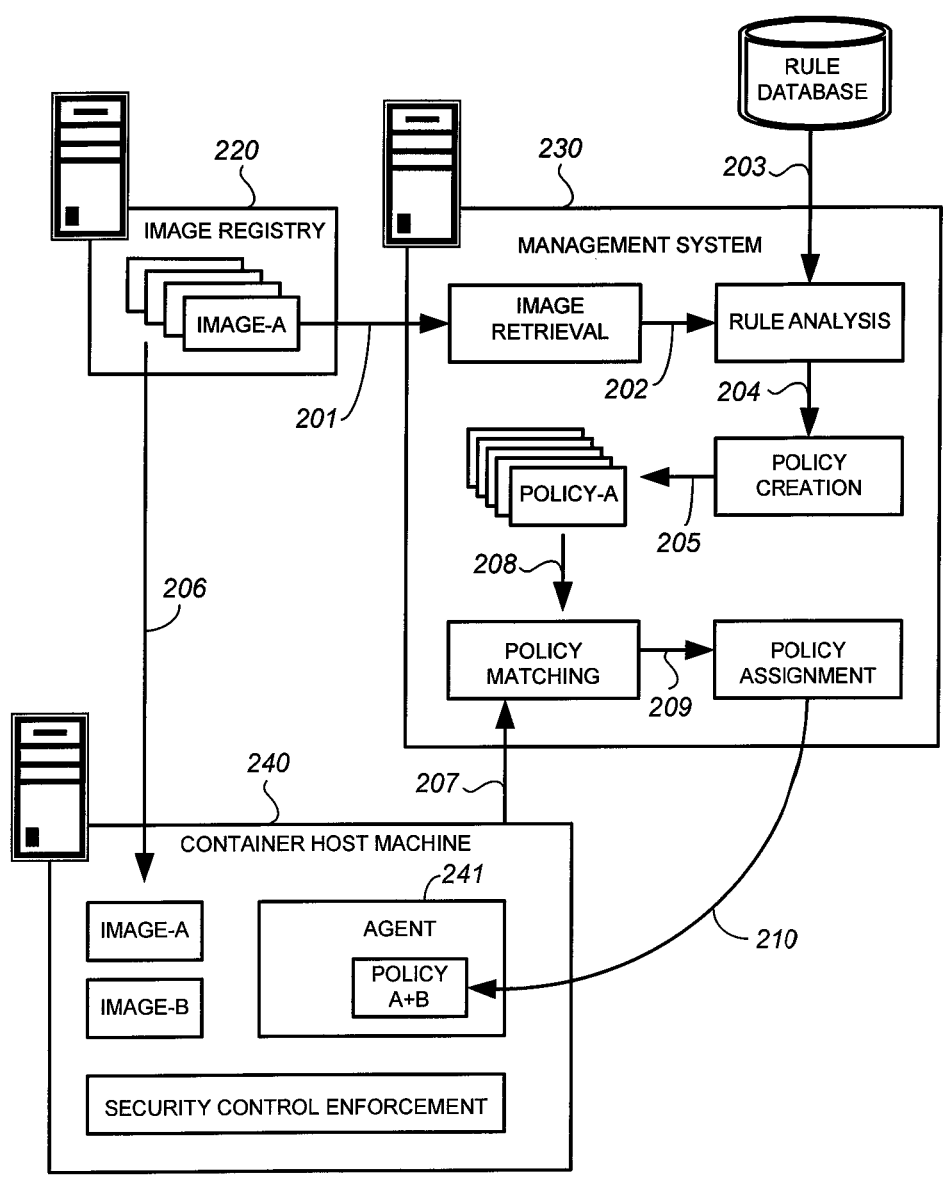
FIG. 3 shows an operational diagram of the system of FIG. 2 in accordance with an embodiment of the present invention.

FIG. 3 shows an operational diagram of the system of FIG. 2 in accordance with an embodiment of the present invention. In the example of FIG. 3, the image registry 220 stores a plurality of images of containers (image-A, image-B, image-C, etc.). The policy management system 230 retrieves images and corresponding metadata from the image registry 220 (see arrow 201). An image and its metadata may be retrieved from the image registry 220 by using open REST application programming interfaces (APIs), for example.

To create an application-specific policy for an image, the policy management system 230 may analyze application programs and other pieces of software containerized in the image (see arrow 202) to identify rules (see arrow 203) that are applicable to the image. Generally speaking, a rule may be enforced to protect the computer network and its nodes (e.g., container host machines, file servers, user computers, etc.). A rule may include one or more conditions that indicate when the rule is to be applied. For example, a rule may be a network protection rule that applies to application programs that access ports 80 and 443. As another example, a rule may be a resource access protection rule that applies to access to a particular server. A rule is applicable to an image when the image or a layer of the image performs an operation that is governed by the rule. Rules may be created by antivirus researchers, system administrator, or other personnel, and may be received by the policy management system 230 from a rule database over the computer network.

A computer security policy may comprise one or more rules and corresponding conditions for which the rules apply. For example, a policy may comprise a network protection rule that applies to application programs that are assigned to ports 80 and 443 and conditions when the network protection rule applies, such as presence of active processes, presence of files in certain directories, particular version of applications or files with known vulnerabilities, etc. The security policy may also indicate a response action to take when the security policy is violated, e.g., block network traffic of a particular application program to port 80 when a particular active process is present and running. In the creation of a policy for an image, the policy management system 230 may identify ports that are accessed by an application program containerized in the image (e.g., by scanning the image metadata) and assign network rules that are applicable to the image.

The policy management system 230 may receive from the image registry 220 a metadata of an image. An image metadata received from the image registry 220, which is referred to herein as "registry image metadata", has additional information that is not available from the image itself. The registry image metadata may identify the layers of the image, allowing for retrieval of the full file content of the layers. An image and a layer of the image may be referenced by a corresponding globally unique identifier (GUID), such as an SHA-256 hash. More particularly, the name and full content of each of the application programs (as identified by corresponding GUIDs), their configuration files, etc. are available on a layer by layer basis. The policy management system 230 may take advantage of information available from the image and its registry image metadata to apply file and file version based conditions to images for rule assignment.

The policy management system 230 may create an application-specific policy for an image, for each layer of the image, based on rules and corresponding conditions that are applicable to the image (see arrow 205). The policy management system 230 stores the application-specific policies (e.g., policy-A for image A, policy-B for image B, etc.) for distribution to container host machines 240 that report having corresponding images.

In the example of FIG. 3, the agent 241 detects when the container host machine 240 pulls one or more images (e.g., image-A, image-B) from the image registry 220 (see arrow 206). The agent 241 may scan an image for metadata that identifies resources accessed by the image, layers of the image (e.g., application programs), etc. For example, the metadata of the image may contain information that includes the SHA-256 hash of the image, the ports exposed by the image, the SHA-256 hash of the layers of the image, etc.

In response to detecting the presence of the images in the container host machine 240, the agent 241 sends a notification to the policy management system 230 that the images have been detected in the container host machine 240 (see arrow 207). The notification may include the identifier (e.g., SHA-256 hash) of the image and timestamp when the image was detected in the container host machine 240.

In response to receiving the notification, the policy management system 230 performs policy matching to identify policies (e.g., policy-A for image-A, policy-B for image-B) that are specific to the images (see arrow 208). More particularly, the policy management system 230 may extract the identifiers of the images from the notification and identify the application-specific policies for those identifiers. The policy management system 230 then assigns the identified matching policies to be enforced in the container host machine 240 (see arrow 209). The policy management system 230 may provide the matching policies to the container host machine 240 over the computer network (see arrow 210).

The agent 241 receives the policies from the policy management system 230 (see arrow 210). The agent 241 may merge the policies with currently existing policies. For example, assuming a policy-B already exists for the image-B, the agent 241 may receive a policy-A from the policy management system 230 and merge the policy-A with the policy-B to form a union policy A+B, i.e., a merger or combination of the policy-A and policy-B. The agent 241 may also simply add the policy-A as another, separate policy that is enforced independently in the container host machine 240. Either way, the container host machine 240 may perform security control enforcement by enforcing the policies.

In one embodiment, the agent 241 adapts a policy based on runtime information of the image. More particularly, the agent 241 may amend a policy to reflect changed values of parameters, conditions, etc. when an instance of the image is created. For example, the agent 241 may scan the image instance metadata of the container. The image instance metadata may indicate additional information that is not necessarily included in the metadata of the image. Using the network protection rule example, the port binding of the image (e.g., port 443) may be different at runtime (e.g., port 443 is assigned to port 8443). In that case, any policy involving port 443 will be adapted to port 8443 instead.

In one embodiment, in situations where a policy is not available for an image or a layer of the image, the agent 241 may adopt a policy that best closely matches the image or layer of the image. This is further explained with reference to FIG. 4, which shows a hierarchical diagram of layers of an example image.

Figure 4:
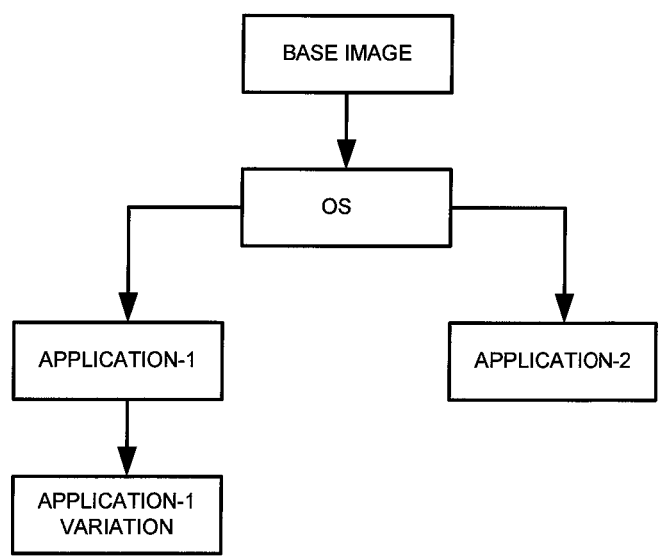
FIG. 4 shows a hierarchical diagram of layers of an example image.

A layer of an image represents a change in the file system of the image. In the example of FIG. 4, the base image is changed to include operating system components on the next layer, an application program-1 (application-1) and an application program-2 (application-2) on a next lower layer, and a variation of the application program-1 (application-1 variation) on the next lower layer. It is possible that the policy management system 230 has generated a policy for each layer of an image. However, it is also possible that there is a no pre-generated policy for a particular layer. For example, there may be a pre-generated policy for the application program-1 and operating system components, but not for the application program-2. In that case, the agent 241 may assign the policy for the operating system components or the policy for the application program-1 as the policy for the application program-2, depending on implementation details or policy availability. As another example, if a pre-generated policy is not available for the variation of the application program-1, the policy for the application program-1 may be assigned by the agent 241 to the variation of the application program-1.

Furthermore, since each layer represents a change to the ancestor layer, the layer metadata may be used to speed up the rules by applying the rules only on the changes introduced in a new layer. For example, if a new layer exposes a port, the policy for that layer may be generated as the union of its ancestor layer and whatever rules apply to the exposed port. Similarly, adding a software package in a layer would result in a policy of the ancestor layer plus rules applicable to the software package. Other useful metadata in policy computation include image labels and mounted volumes.

Figure 5:
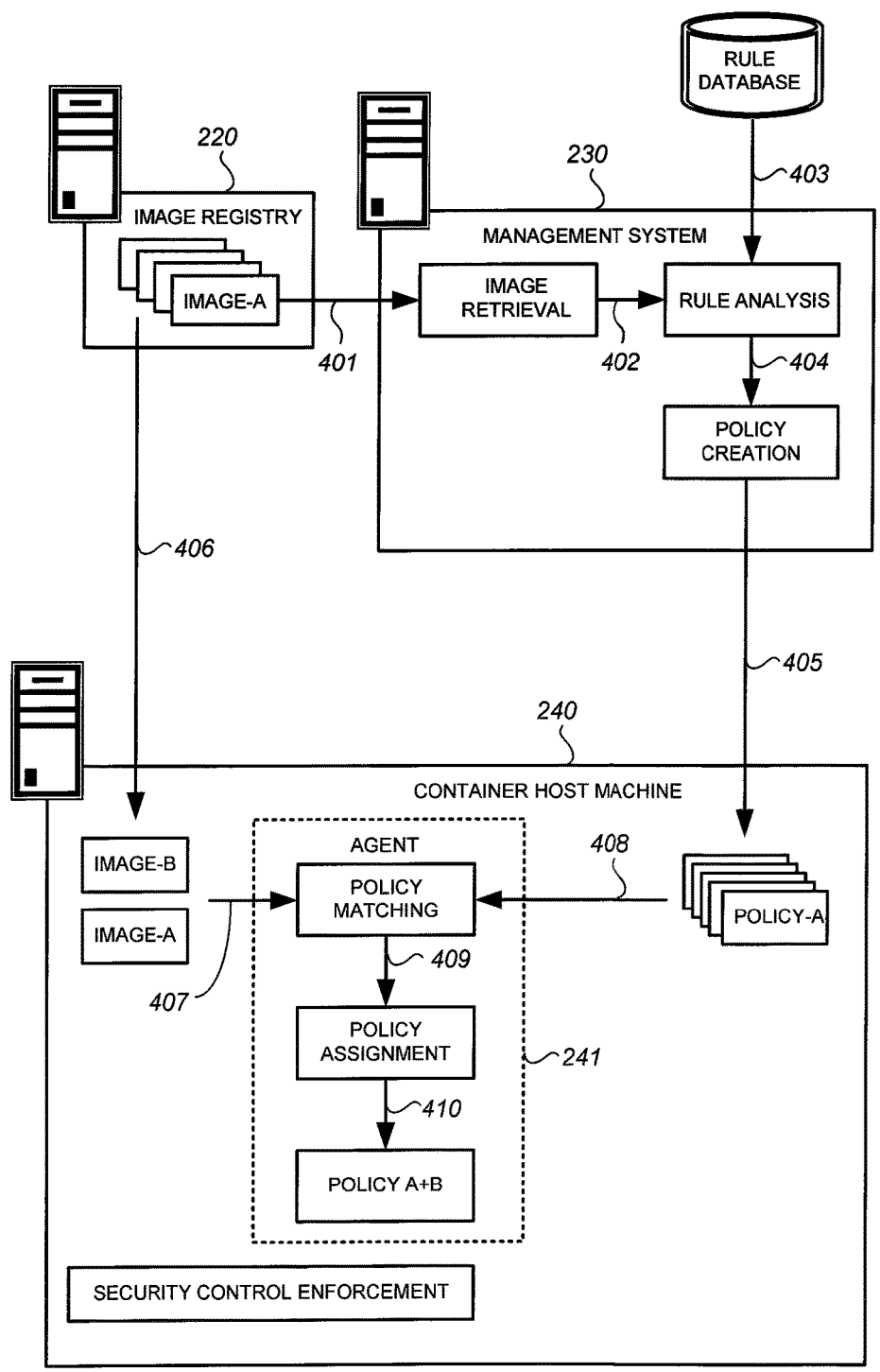
FIG. 5 shows an operational diagram of the system of FIG. 2 in accordance with another embodiment of the present invention.

FIG. 5 shows an operational diagram of the system of FIG. 2 in accordance with another embodiment of the present invention. The operational diagram of FIG. 5 is the same as that of FIG. 3, except that policies generated by the policy management system 230 are transferred to the container host machine 240 regardless of whether or not the container host machine 240 has the corresponding images. That is, the operational diagrams of FIGS. 3 and 5 are the same except that the container host machine 240 does not have to notify the policy management 230 to obtain policies. Policy matching and policy assignment are performed locally in the container host machine 240.

In the example of FIG. 5, image retrieval from the image registry 220 (see arrow 401), rule analysis (see arrow 402) based on applicable rules (see arrow 403), and policy creation are (see arrow 404) are as previously explained with reference to FIG. 3. In the example of FIG. 5, because all policies generated by the policy management system 230 are stored locally in the container host machine 240 (see arrow 405), the agent 241 no longer needs to notify the policy management system 230 when an image is pulled by the container host 240 from the image registry 220 (see arrow 406). Instead, the agent 241 detects presence of the image in the container host machine 240 (see arrow 407), performs policy matching to identify applicable policies (see arrow 408), and performs policy assignment to assign a policy (see arrow 409) as previously discussed with reference to FIG. 3. The policy assigned to the image may be a union of existing policies enforced in the container host machine 240 (policy A+B) or enforced as an independent policy. This approach advantageously speeds up policy assignment and removes the need for the policy management system 230 to be always online and accessible, which is critical in enterprise networks where the policy management system 230 is off-premise (e.g., provided by a third-party over the Internet). The policy management system 230 may periodically update the policies in the container host machine 240, e.g., upon generation of a policy for a newly available image from the image registry 220, without waiting for a notification from the container host machine 240 that corresponding images have been received in the container host machine 240.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
   retrieving an image of a software container from an image registry;
   scanning the image to identify a rule that is specific to the image;
   creating a computer security policy for the image, the computer security policy including the rule, the computer security policy dictating permissible operations of an application program that is containerized in the image;
   retrieving the image into a container host machine that is configured to host the application program that is containerized in the image;
   retrieving the computer security policy into the container host machine;
   identifying the computer security policy as specific to the image; and
   enforcing the computer security policy in the container host machine.

2. The method of claim 1, wherein retrieving the computer security policy into the container host machine comprises:
   sending a notification to a policy management system that the image is present in the container host machine;
   in response to receiving the notification, providing the computer security policy from the policy management system to the container host machine over a computer network.

3. The method of claim 2, further comprising:
   the container host machine merging the computer security policy with a pre-existing computer security policy to generate a merged computer security policy; and
   enforcing the merged computer security policy in the container host machine.

4. The method of claim 2, further comprising:
   scanning the image in the policy management system to identify the rule that is specific to the image;
   creating the computer security policy for the image that includes the rule in the policy management system; and
   storing the computer security policy rule in the policy management system.

5. The method of claim 4, further comprising:
   scanning the image in the policy management system to identify a layer of the image.

6. The method of claim 1, wherein retrieving the computer security policy into the container host machine comprises:
   receiving a plurality of computer security policies in the container host machine; and
   in the container host machine, identifying the computer security policy from among the plurality of computer security policies as specific to the image.

7. The method of claim 1, wherein the application program that is containerized in the image accesses a port in the container host machine, and wherein the rule governs access to the port and indicates a condition on when the rule applies.

8. A system for managing computer security policies, the system comprising:
   a policy management system comprising a memory and a processor, the memory of the policy management system storing instructions that when executed by the processor of the policy management system cause the policy management system to perform the steps of: retrieving an image of a software container from an image registry, scanning the image to identify a rule that is specific to the image, creating a computer security policy that includes the rule that is specific to the image, receiving a notification that the image has been pulled into a container host machine, identifying the computer security policy as being specific to the image, and providing the computer security policy to the container host machine in response to receiving the notification, wherein the computer security policy dictates permissible operations of an application program that is containerized in the image; and
   a container host machine comprising a memory and a processor, the memory of the container host machine storing instructions that when executed by the processor of the container host machine cause the container host machine to perform the steps of: retrieving the image from the image registry, hosting the application program that is containerized in the image, sending the policy management system the notification that the image is in the container host machine, receiving the computer security policy from the policy management system after sending the notification, and enforcing the computer security policy in the container host machine.

9. The system of claim 8, wherein the image registry and the container host machine are in an enterprise network.

10. The system of claim 9, wherein the policy management system is off-premise outside the enterprise network.

11. The system of claim 9, wherein the instructions stored in the memory of the container host machine, when executed by the processor of the container host machine, cause the container host machine to perform the steps of: merging the computer security policy with a pre-existing computer security policy to generate a merged computer security policy, and enforcing the merged computer security policy in the container host machine.

12. The system of claim 8, wherein the application program that is containerized in the image accesses a port in the container host machine, and wherein the rule governs access to the port and indicates a condition on when the rule applies.

13. A system for managing computer security policies, the system comprising:
   a policy management system comprising a memory and a processor, the memory of the policy management system storing instructions that when executed by the processor of the policy management system cause the policy management system to perform the steps of: retrieving an image of a software container from an image registry, scanning the image to identify a rule that is specific to the image, creating a computer security policy that includes the rule that is specific to the image, and providing the computer security policy to a container host machine without waiting for the container host machine to notify the policy management system that the image is present in the container host machine, wherein the computer security policy dictates permissible operations of an application program that is containerized in the image; and a container host machine comprising a memory and a processor, the memory of the container host machine storing instructions that when executed by the processor of the container host machine cause the container host machine to perform the steps of: receiving the computer security policy from the policy management system, retrieving the image from the image registry, hosting the application program that is containerized in the image, identifying the computer security policy as applicable to the image, and enforcing the computer security policy in the container host machine.

14. The system of claim 13, wherein the image registry and the container host machine are in an enterprise network.

15. The system of claim 14, wherein the policy management system if off-premise outside the enterprise network.

16. The system of claim 13, wherein the instructions stored in the memory of the container host machine, when executed by the processor of the container host machine, cause the container host machine to perform the steps of: merging the computer security policy with another computer security policy to generate a merged computer security policy, and enforcing the merged computer security policy in the container host machine.

17. The system of claim 13, wherein the application program that is containerized in the image accesses a port in the container host machine, and wherein the rule governs access to the port and indicates a condition on when the rule applies.

* * * * *